United States Patent Office 3,123,631
Patented Mar. 3, 1964

3,123,631
PROCESS FOR PREPARING ESTERS OF
ANTHRANILIC ACID
Roger P. Staiger, Collegeville, Pa., and George F. Schlaudecker and Emery B. Miller, Toledo, Ohio, assignors to Maumee Chemical Company, Toledo, Ohio, a corporation of Ohio
No Drawing. Filed Sept. 9, 1957, Ser. No. 682,630
6 Claims. (Cl. 260—471)

This invention relates to isatoic anhydride reaction products, and to a method for reacting isatoic anhydride with various hydroxyl-containing, thiol-containing, and similar inorganic and organic compounds.

Isatoic anhydride has been known for some time (see German Patents 110,577 and 112,976), but neither it nor any compound produced from it has found any commerical use.

The present invention is based upon the discovery of an improved method for producing certain reaction products from isatoic anhydride, and of useful isatoic anhydride reaction products.

It is, therefore, an object of the invention to provide an improved method for producing certain reaction products of isatoic anhydride.

It is a further object of the invention to provide useful isatoic anhydride reaction products.

Other objects and advantages will be apparent from the description which follows, which is intended only to illustrate and disclose, but in no way to limit, the invention.

According to one aspect of the invention, an improved method for producing an ester, a thio ester, a seleno ester or a telluro ester from isatoic anhydride is provided. In some cases the esters may be anthranilates, while in other instances, the reaction product is an ester of N-carboxy anthranilic acid (isatoic acid) in which the carboxyl attached directly to the benzene ring is not esterified. The two reactions are represented, respectively, in Equations 1 and 2, below, wherein R represents, for example, an alkyl radical:

EQUATION 1

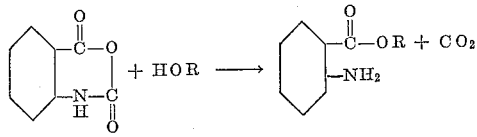

EQUATION 2

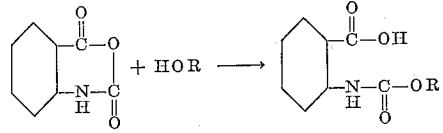

Such reactions proceed between solutions comprising isatoic anhydride and an organic hydroxyl-containing compound in the presence of small amounts of a base. It has been found that, in many instances, reaction 1 or reaction 2 proceeds, virtually to the exclusion of the other, and that in such instances, the nature of the hydroxyl-containing compound principally determines which of the two reaction types takes place. When such reactant is a primary aliphatic alcohol or a phenol, reaction 1 proceeds to produce a high yield of an anthranilate. Similarly, reaction 1 predominates with reactants having the generic formula R—TH, where T is a non-metallic element from the sixth group of the periodic system having an atomic number from 8 through 52, inclusive (i.e., oxygen, sulfur, selenium or tellurium), and R is an organic group, and preferably, is aryl, or a radical having the formula —$CH_2$—R' in which R' is hydrogen, or an organic group, and preferably is hydrogen, alkyl, aryl, alkenyl, alkynyl, or acyl.

When the reactant other than isatoic anhydride is a tertiary alcohol, reaction 2 proceeds to produce a high yield of an alkyl ester of N-carboxyl anthranilic acid (isatoic acid) in which the carboxyl that is attached directly to the benzene ring is not esterified.

It has been found that both reaction 1 and reaction 2 proceed when the reactants are isatoic anhydride and a secondary alcohol, such as isopropanol.

It is convenient to conduct a reaction until all isatoic anhydride which is only sparingly soluble in most solvents, has been consumed. The anhydride, therefore, is preferably used in not more than stoichiometric amounts, although, if desired, a substantial excess of either reactant can be employed. It is usually advantageous to warm the reaction mix slightly, for example to a temperature from about 45° C. to the boiling temperature of the mix, and to maintain a temperature within such range until reaction has proceeded to a desired extent, for example for from 30 minutes to several hours.

A base is employed in only a catalytic quantity in producing an anthranilic acid ester according to the method of the invention. For example, as little as about 1 percent of a base has been found to be effective, and, in ordinary practice, it has usually been preferred to use from about 2 percent to about 10 percent of a base. Greater amounts can be employed, if desired, but there appears to be no advantage, unless a salt of the final reaction product is desired, in which case the stoichiometric amount of the base for production of such salt, plus a small excess should be employed.

The terms "percent" and "parts" are used herein and in the appended claims to refer to percent and parts by weight, unless otherwise indicated.

In general, any base can be employed in carrying out a reaction with isatoic anhydride in accordance with the invention. It is usually preferred, however, to use a strong base, usually a strong inorganic base, and, most desirably, an alkali metal hydroxide. Excellent results have been obtained when the base has been sodium hydroxide.

The invention has been defined, in Equations 1 and 2, above, in connection with the reaction of isatoic anhydride with various alcohols. It will be appreciated that other hydroxyl-containing organic materials, as well as various thiol-compounds, selenol-compounds, and tellurol-compounds, can be similarly reacted. Such organic compounds can be represented by the generic formula RTH, wherein T is a non-metallic element from the sixth group of the periodic system haivng an atomic number from 8 through 52, inclusive, and R is an organic radical. In a preferred class of such organic compounds, R is a member of the group consisting of aryl, and those having the formula —$CH_2$—R' in which R' is a member of the group consisting of hydrogen, alkyl, aryl, alkenyl, alkynyl, and acyl. Another preferred class of such organic compounds can be represented by the generic formula

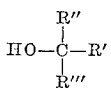

wherein R' has the meaning previously set fort, R" and R'" have the same meanings as R' and not more than one of the symbols R', R" and R'" represents hydrogen. Most desirably, none of the symbols R', R" and R'" represents hydrogen.

In addition to the preferred classes of hydroxyl-, thiol-, selenol-, and tellurol-organic compounds identified in the preceding paragraph, it will be appreciated that various other thiol or hydroxyl compounds can be so reacted. As a specific example of another such reactant, mention may be made of cellulose, which is believed to have a molecular structure made up of an undetermined number of repeating cellobiose units, hydroxyl-containing polyester materials and polyvinyl alcohol, which is chemically somewhat similar to cellulose.

As is indicated above, certain new compositions of matter are provided according to the invention. One class of such new compounds is characterized by the presence in its molecular structure of the group

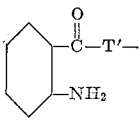

wherein T' is a non-metallic element from the sixth group of the periodic system having an atomic number from 16 thorugh 52, inclusive (i.e., sulfur, selenium or tellurium). Such new compositions of matter can be acids, acid salts, or esters. The acids can be represented by the generic formula

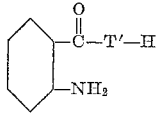

wherein T' has the meaning previously stated. The salts can be formed by reaction of any metal hydroxide with any of the acids. The esters have the generic formula

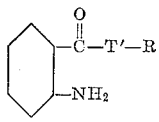

wherein T' has the meaning previously stated, and R is an organic radical. As is indicated above, a preferred class of esters is one wherein R is aryl, or has the formula —$CH_2$—R' where R' is hydrogen, alkyl, aryl, alkenyl, alkynyl, or acyl.

In some instances, products of reaction of isatoic anhydride and an organic hydroxyl compound produced according to the method of the invention are useful per se or as organic intermediates. For example, some of the esters of anthranilic acid produced by the reaction represented by Equation 1, above, are directly useful as perfume essences. In other instances, such reaction products are, as a practical matter, modified materials of known utility, which have increased utility by virtue of the modification. For example, cellulose modified by reaction with isatoic anhydride in accordance with the invention would have at least one functional group which was not present in the original cellulose, and may have two such functional groups. In either case, an amino group would have been added to the cellulose molecule, so that the chemical composition would resemble wool in some respects, and it is likely that the modified cellulose could be dyed directly, for example with an acid reacting wool dye. Furthermore, when a polyvinyl alcohol or a hydroxyl-containing polyester material is reacted with isatoic anhydride in accordance with the invention, the reaction product is a modified polyvinyl alcohol or polyester containing functional groups which were not present in the starting material. Such additional functional groups, or new functional groups, enable reactions of which the original starting materials were incapable. For example, such reaction product from a polyvinyl alcohol could be reacted with a polyhydroxy organic compound, for example a glycol, in order further to increase its molecular weight at a desired stage in processing. By using glycerol, pentaerylthritol or other cross-linking agent having three or more hydroxyl groups, the possibility would exist of producing a modified polyvinyl alcohol having a cross-linked molecular structure, which would be expected to be thermosetting.

It will also be noted from Equation 1, above, that carbon dioxide can be evolved during the course of a reaction in accordance with the invention. In some instances, the evolved carbon dioxide can be utilized as a blowing agent in the production of foamed or cellular materials.

The following examples are presented solely for the purpose of further illustrating and disclosing the invention and are in no way to be construed as limitations thereon.

*Example 1*

Isatoic anhydride was reacted with various organic compounds having the generic formula R—TH to produce corresponding anthranilates according to the following procedure.

A large glass test tube was charged with a 3-milliliter portion of absolute methyl alcohol, 2 grams of isatoic anhydride, and one pellet (approximately 1/10 gram) of sodium hydroxide. The resulting reaction mixture was then warmed over a steam bath. After a short period of heating, gas evolution was noted; heating was continued until gas evolution ceased. Most of the sodium hydroxide pellet remained intact in the reaction mixture, and was removed after heating was discontinued. A 30-milliliter portion of cold distilled water was added with swirling to dilute the mixture. Methyl anthranilate at this point was present in the test tube below the aqueous phase, and was separated from the water. A 1.74-gram portion (94 percent of theory) of almost colorless methyl anthranilate, having a crystal point of 24° C. without purification, was recovered.

Methyl anthranilate hydrochloride was produced by dissolving a ½ milliliter portion of the methyl anthranilate in absolute diethyl ether, and adding to the resulting solution a sufficient quantity of concentrated hydrochloric acid for complete reaction with the ester. A voluminous precipitate of fine white needles formed immediately, and was separated from the liquid by vacuum filtration, and washed twice with cold diethyl ether. The resulting methyl anthranilate hydrochloride had a melting point of 180° C.

The picric acid salt of methyl anthranilate was produced by mixing two solutions, one of which was a saturated solution of picric acid in 5 milliliters of methanol, and the other of which contained ½ milliliter of methyl anthranilate dissolved in methanol, adding a few drops of distilled water until the combined solution appeared murky, warming the combined solution until the murkiness disappeared, and then cooling the cleared solution in an ice bath, with stirring, until the picric acid salt crystallized as bright yellow needles. The yellow needles were separated from the mother liquor by vacuum filtration, and washed sparingly with cold methanol. After drying, the picric acid salt of methyl anthranilate had a melting point of 103° C.

Various other anthranilates have been produced in accordance with the invention. The starting materials, amounts, products, properties and derivatives produced are given in Table I, below, solely for the purpose of illustrating further reactions of isatoic anhydride:

TABLE I

| Grams Isatoic Anhydride | R—TH Compound Identity | Base Grams Unless Otherwise indicated | Base Identity | Solvent Gram | Solvent Identity | Solvent Milliliters | Reaction Temperature | Product | Melting Point, °C |
|---|---|---|---|---|---|---|---|---|---|
| 2.0 | 95% ethanol | 5 ml. | NaOH | 2/16 | none added | | | ethyl anthranilate | colorless liquid |
| 2.56 | cinnamyl alcohol | 2.11 | NaOH | 1/4 | dioxane | 5 | 80 | cinnamyl anthranilate | 61–61.5. |
| 2.88 | do | 2.82 | NaOH | 1/16 | acetone | 5 | | do | 61–61.5 |
| 2.74 | beta-phenethyl alcohol | 2.05 | NaOH | 1/10 | dioxane | 5 | 70 | beta-phenethyl anthranilate | colorless oil. |
| 2.0 | allyl alcohol | 3 ml. | NaOH | 1/16 | none added | | 50–55 | allyl anthranilate | oil. |
| 2.0 | cyclohexanol | 5 ml. | NaOH | 1/16 | do | | 85 | cyclohexyl anthranilate | oil. |
| 1.8 | linalool | 0.86 | NaOH | 1/16 | dioxane | 2 | 95 | linalyl anthranilate | yellow oil. |
| 2.0 | ethylene glycol | 4 ml. | NaOH | 1/16 | none added | | 45 | beta-hydroxyethyl anthranilate. | sweet oil |
| 1.95 | phenol | 1.13 | NaOH | 1/16 | dioxane | 4 | 45 | phenyl anthranilate | 70. |
| 2.0 | resorcinol | 1.35 | NaOH | 1/16 | do | 5 | | 3-hydroxyphenyl anthranilate | about 30. |
| 2.0 | isopropyl alcohol | 5 ml. | NaOH | 1/2 | none added | | 75–95 | isopropyl anthranilate | |
| 2.0 | vanillin | 1.88 | NaOH | 1/2 | dioxane | 5 | 80–85 | 2-methoxy-4-formylphenyl anthranilate. | 84–86. |
| 2.53 | methyl salicylate | 2.36 | NaOH | 1/2 | do | 5 | 80–90 | o-carbomethoxyphenyl anthranilate. | 70–71. |
| 2.0 | alpha naphthol | 1.77 | NaOH | 1/2 | do | 5 | 55 | alpha naphthyl anthranilate | 86–87. |
| 2.0 | beta naphthol | 1.77 | NaOH | 1/2 | do | 10 | 55 | beta naphthyl anthranilate | 118. |
| 2.0 | thymol | 1.84 | NaOH | 1/2 | do | 5 | 75 | thymyl anthranilate | |
| 3.59 | n-butyl alcohol | 1.63 | NaOH | 1/2 | do | 5 | 80 | n-butyl anthranilate | colorless liquid. |
| 5.0 | methanethiol | 8.0 | NaOH | 1/16 | do | 10 | 60 | methyl thio-anthranilate | amber liquid. |
| 1.6 | benzenethiol | 1.1 | NaOH | 1/16 | do | 5 | 70 | phenyl thio-anthranilate | 103–105. |
| 4.0 | hydrogen sulfide | excess | NaOH | 1/6 | do | 10 | 75 | thioanthranilic acid | 130–157 (hot stage). |
| 2.42 | Na₂S·9H₂O | 3.54 | | | do | 10 | 60 | sodium thioanthranilate | |
| 3.47 | Na₂S·9H₂O | 1.66 | | | H₂O | 20 | 75 | do | |
| 4.3 | ethanethiol | 1.5 | NaOH | 1/12 | dioxane | 10 | 60 | ethyl thio-anthranilate [1] | yellow oil. |
| 4.1 | d-glucose | 1.0 | NaOH | 1/16 | do | 10 | 83 | glucose ester of anthranilic acid.[2] | 112–114 (hot stage). |
| 2.33 | 2-mercaptoethanol | 1.0 | NaOH | 1/16 | do | 5 | 67 | beta-hydroxyethyl thioanthranilate. | yellow oil. |
| 1.88 | geraniol | 1.7 | NaOH | 1/16 | do | 10 | 80 | geranyl anthranilate | Do. |
| 4.03 | p-aminophenol | 2.68 | NaOH | 2/3 | do | 10 | 60 | p-aminophenyl anthranilate | 160. |
| 4.00 | do | 2.68 | NaOH | 1/16 | do | 10 | 60 | o-aminobenz-p-hydroxyphenylamide. | 198. |
| 5.87 | ethylene glycol | 1.0 | NaOH | 1/16 | do | 10 | 75–90 | ethylene glycol dianthranilate [3] | 125–126. |
| 3.76 | furfuryl alcohol | 2.0 | NaOH | 1/16 | do | 10 | 80 | furfuryl anthranilate | 118–120. |
| 2.35 | mercaptoacetic acid | 1.3 | NaOH | 1/26 | do | 5 | 88 | carboxymethyl thioanthranilate. | |
| 2.35 | beta-hydroxyethyl thioanthranilate | 2.8 | NaOH | 1/16 | do | 5 | 100 | o-aminobenzoyloxyethyl thio-anthranilate.[4] | 97–101. |
| 1.6 | dichlorophene | 2.7 | NaOH | 1/16 | do | 5 | 64 | dichlorophene monoanthranilate. | 199 (hot stage). |
| 2.0 | 2-butyne-1, 4-diol | 1.1 | NaOH | 1/16 | do | 5 | 100 | 2-butyne 1, 4-diol monoanthranilate. | 100–103. |
| 3.86 | methallyl alcohol | 1.5 | NaOH | 1/26 | do | 10 | 100 | methallyl anthranilate | yellow liquid. |
| 1.63 | pentaerythrityltetrathiol | 0.5 | NaOH | 1/16 | do | 5 | 75 | pentaerythrityltetrathiol tetrathioanthranilate. | 210. |

[1] Boiling point at 15 mm. of Hg pressure = 172° C.; refractive index $n_D^{25} = 1.6340$; density = 1.1659 grams per cc. at 23° C.
[2] This product was strongly fluorescent under ultra violet light, and might be used as a "whitener" for washed clothing.
[3] Compounds of this type might be used as hardeners for epoxy resins.
[4] Compounds of this type might be used as hardeners for epoxy resins.

| Product | HCl Color | HCl Melting Point, °C | Picric Acid Color | Picric Acid Melting Point, °C | 1,3,5-Trinitrobenzene Color | 1,3,5-Trinitrobenzene Melting Point, °C |
|---|---|---|---|---|---|---|
| Ethyl anthranilate | white | 109 | | ([5]) | orange-red | 70.5 |
| Cinnamyl anthranilate | do | 156–157 | yellow | 108–109 | golden yellow | 129 |
| Beta-phenethyl anthranilate | | 141–148 | | | | 94–95 |
| Allyl anthranilate | | 120–125 | | 71–73 | | 69 |
| | | 184–185 | | | | 136–137 |
| Beta-naphthyl anthranilate | | 130–135 | | 118.0–118.5 | | 121 |
| Thymyl anthranilate | white | 127–128 | yellow | 83–85 | orange | 61–62 |
| n-Butyl anthranilate | do | 185–187 | | 99 | yellow-orange | 126 |
| Methyl thioanthranilate | do | 172–174 | orange-red | 88–89 | orange | 122 |
| Phenyl thioanthranilate | | indefinite | yellow | indefinite | do | 186 |
| Thioanthranilic acid | | 145–150 | do | 71–72 | do | 66 |
| Ethyl thioanthranilate | white | 163–165 | golden yellow | 99–100 | do | 84–85 |
| Beta-hydroxyethyl anthranilate | do | | yellow | 117–119 (hot stage) | | |
| Geranyl anthranilate | | | | 151 | | 152 |
| Ethylene glycol dianthranilate | white | 205 | do | | do | 80 |
| Furfuryl anthranilate | do | 128–135 | do | | do | 123 |
| 2-butyne-1,4-diol monoanthranilate | tan | 145–160 | do | 134 | yellow | 63 |
| Methallyl anthranilate | white | 128–130 | dark yellow | 128–130 | orange | |

[5] The melting point of the benzene sulfonyl chloride derivative was 92.5° C.

Example 2

Carbamates have also been produced according to the method of the invention. Typical preparations thereof are reported below:

A large test tube was charged with 2 grams of isatoic anhydride, 4 grams of tertiary butyl alcohol, and two crushed pellets (approximately 0.2 gram) of sodium hydroxide, and the resulting mixture was heated to about 70° C. A 5-milliliter portion of dioxane was then added to the reaction mixture, and reaction was continued, with agitation, at 70 to 85° C. for a period of 1½ hours. Heating was then discontinued, and a mixture of chipped ice and water was added to the test tube. A sweet grape odor was noted, indicating that some tertiary butyl anthranilate had been produced, but no separate oil phase was observed. A sample of the resulting reaction mixture was acidified, whereupon a heavy voluminous slightly yellow precipitate of t-butyl N-o-carboxyphenyl carbamate formed, and was recovered. This product had a hot stage melting point of 165–167° C.

Isopropyl N-o-carboxyphenyl carbamate has also been produced, using a reaction mixture of 2.0 grams of isatoic anhydride, 10-milliliters of isopropyl alcohol, and 0.5 gram of sodium hydroxide as the starting materials, and generally the reaction conditions and procedure described in the preceding paragraph. The product, after recrystallization, had a hot stage melting point of 160° C.

It has been found to be essential that at least a part of the isatoic anhydride reactant dissolve in the reaction mixture. When the other reactant is a solvent type material, such as methyl alcohol, ethyl alcohol, allyl alcohol, ethylene glycol or the like (see Example 1), an excess of such reactant can be employed to act as a solvent for the isatoic anhydride. In other instances, a solvent can be added as such; the specific identity of the solvent, in such case, is unimportant, provided that it itself does not react with isatoic anhydride, unless a mixture of reaction products is desired. For example, in producing a perfume essence, it might be desired to produce a mixture of methyl-, ethyl-, and n-butyl-anthranilates. In such case, a mixture of the corresponding alcohols, in desired proportions, could be employed as the alcohol reactant and as the solvent.

In many cases, the desired anthranilate or carbamate reaction product is contaminated with unreacted isatoic anhydride. When this is the situation, an easy expedient for purifying the crude reaction product involves merely washing the same with ammonium hydroxide. Isatoic anhydride reacts readily with the ammonium hydroxide, but both carbamates and anthranilates are substantially inert thereto and insoluble therein. The anthranilamide produced from the residual isatoic anhydride is fairly soluble in water, and collects in a water phase, while the desired carbamate or anthranilate remains in a separate phase.

While isatoic anhydride is capable of reaction with water to produce anthranilic acid, it has been found that this reaction proceeds at such a low rate, compared to the rate at which desired anthranilates and carbamates are produced, that it is not necessary to establish anhydrous reaction conditions. Water can be added to the reaction mixture to act as a diluent, or solvents containing appreciable amounts of dissolved water can be used, without serious interference with the desired reaction. It is probable that some anthranilic acid is produced, but in such small proportions as not materially to affect the course of the desired reaction.

It will be apparent that various changes and modifications can be made from the specific details disclosed herein without departing from the spirit and scope of the attached claims.

What we claim is:

1. A method for producing an anthranilic acid ester selected from the group consisting of phenyl anthranilate, n-alkyl anthranilates, methallyl anthranilate, beta phenethyl anthranilate, and 2-butyne-1,4-diol monoanthranilate, which method comprises effecting contact between sodium hydroxide and a solution comprising approximately equimolecular proportions of isatoic anhydride and an alcohol selected from the group consisting of phenol, a primary n alkyl alcohol having from 1 to 4 carbon atoms, methallyl alcohol, beta phenethyl alcohol, and 2-butyne-1, 4-diol, respectively; warming the resulting mixture to a temperature of at least about 45° C., but not higher than about 100° C.; and thereafter separating the anthranilic acid ester from the reaction mixture.

2. A method for producing phenyl anthranilate which comprises effecting contact between sodium hydroxide and a solution comprising approximately equimolecular proportions of isatoic anhydride and of phenol, warming the resulting reaction mixture to a temperature of about 45° C., and thereafter separating phenyl anthranilate from the reaction mixture.

3. A method for producing an alkyl anthranilate which comprises effecting contact between sodium hydroxide and a solution comprising approximately equimolecular proportions of isatoic anhydride and of a primary alkyl alcohol having from 1 to 4 carbon atoms, warming the resulting reaction mixture to a temperature of at least about 45° C., but not higher than about 80° C., and thereafter separating the alkyl anthranilate from the reaction mixture.

4. A method for producing beta phenethylanthranilate which comprises effecting contact between sodium hydroxide and a solution comprising approximately equimolecular proportions of isatoic anhydride and of beta phenethyl alcohol, warming the resulting reaction mixture to a temperature of at least about 45° C., but not higher than about 70° C., and thereafter separating beta phenethylanthranilate from the reaction mixture.

5. A method for producing methallyl anthranilate which comprises effecting contact between sodium hydroxide and a solution comprising approximately equimolecular proportions of isatoic anhydride and of methallyl alcohol, warming the resulting reaction mixture to a temperature of at least about 45° C., but not higher than about 100° C., and thereafter separating methallyl anthranilate from the reaction mixture.

6. A method for producing 2-butyne-1,4-diol monoanthranilate which comprises effecting contact between sodium hydroxide and a solution comprising approximately equimolecular proportions of isatoic anhydride and of 2-butyne-1,4-diol, warming the resulting reaction mixture to a temperature of at least about 45° C., but not higher than about 100° C., and thereafter separating 2-butyne-1,4-diol monoanthranilate from the reaction mixture.

References Cited in the file of this patent

UNITED STATES PATENTS

| | | |
|---|---|---|
| 2,030,093 | Bousquet et al. | Feb. 11, 1936 |
| 2,602,789 | Schwartz et al. | July 8, 1952 |
| 2,706,202 | Bavley et al. | Apr. 12, 1955 |
| 2,716,659 | Kreysa et al. | Aug. 30, 1955 |
| 2,802,838 | Deutschman et al. | Aug. 13, 1957 |
| 2,806,051 | Brockway | Sept. 10, 1957 |

OTHER REFERENCES

Kolbe: J. Prakt. Chem. 30, 469, 474 (1884).
Meyer et al.: J. Prakt. Chem. 33, 22–3 (1886).
Schmidt: J. Prakt. Chem. 36, 370–1, 376–8 (1887).